United States Patent
Yamano

(10) Patent No.: US 10,242,479 B2
(45) Date of Patent: Mar. 26, 2019

(54) INFORMATION PROCESSING DEVICE AND INFORMATION PROCESSING METHOD

(71) Applicant: Sony Corporation, Minato-ku (JP)

(72) Inventor: Takamasa Yamano, Kanagawa (JP)

(73) Assignee: Sony Corporation, Tokyo (JP)

( * ) Notice: Subject to any disclaimer, the term of this patent is extended or adjusted under 35 U.S.C. 154(b) by 178 days.

(21) Appl. No.: 14/368,348

(22) PCT Filed: Jan. 25, 2013

(86) PCT No.: PCT/JP2013/052289
§ 371 (c)(1),
(2) Date: Jun. 24, 2014

(87) PCT Pub. No.: WO2013/115342
PCT Pub. Date: Aug. 8, 2013

(65) Prior Publication Data
US 2014/0347370 A1    Nov. 27, 2014

(30) Foreign Application Priority Data
Feb. 2, 2012    (JP) ................. 2012-020908

(51) Int. Cl.
*G06T 13/80*    (2011.01)
*G06T 7/215*    (2017.01)

(52) U.S. Cl.
CPC ............ *G06T 13/80* (2013.01); *G06T 7/215* (2017.01); *G06T 2207/20021* (2013.01)

(58) Field of Classification Search
None
See application file for complete search history.

(56) References Cited

U.S. PATENT DOCUMENTS

| | | | |
|---|---|---|---|
| 5,914,748 A | 6/1999 | Parulski et al. | |
| 6,366,316 B1 | 4/2002 | Parulski et al. | |
| 6,388,667 B1* | 5/2002 | Sato | A63F 13/10 345/473 |
| 7,388,587 B1 | 6/2008 | Richardson | |
| 7,629,977 B1 | 12/2009 | Richardson | |
| 2003/0222888 A1 | 12/2003 | Epshteyn | |
| 2005/0225566 A1* | 10/2005 | Kojo | G06T 13/80 345/629 |

(Continued)

FOREIGN PATENT DOCUMENTS

JP    2011-035636 A    2/2011

OTHER PUBLICATIONS

International Search Report dated Sep. 5, 2013 in PCT/JP2013/052289.

(Continued)

*Primary Examiner* — James A Thompson
(74) *Attorney, Agent, or Firm* — Chip Law Group

(57) ABSTRACT

An information processing device, method and computer program product provide mechanisms for making a moving photograph. The information processing apparatus includes a moving area detector configured to detect a moving area in images of a processing target image group. The processing target image group includes a base image and a plurality of reference images. A display controller causes the base image to be displayed along with each of the plurality of reference images in succession.

21 Claims, 14 Drawing Sheets

(56) References Cited

U.S. PATENT DOCUMENTS

| | | | | |
|---|---|---|---|---|
| 2008/0259167 A1* | 10/2008 | Richardson | ............ | G06T 13/80 |
| | | | | 348/207.99 |
| 2010/0177194 A1* | 7/2010 | Huang | .................... | G06T 7/208 |
| | | | | 348/157 |
| 2011/0216076 A1* | 9/2011 | Kim | ........................ | G06T 13/00 |
| | | | | 345/473 |
| 2011/0249092 A1* | 10/2011 | Jacobs | ................. | G02B 27/017 |
| | | | | 348/43 |
| 2012/0221418 A1* | 8/2012 | Smith | .................... | G06Q 30/02 |
| | | | | 705/14.67 |
| 2014/0049547 A1* | 2/2014 | Cabanier | ................. | G06T 13/00 |
| | | | | 345/473 |

OTHER PUBLICATIONS

Ramprasad Polana, et al, "Recognizing activities", Pattern Recognition, vol. 1, XP010216142, Oct. 9, 1994, pp. 815-818.

Xiaofeng Tong, et al., "Periodicity detection of local motion", IEEE International Conference on Multimedia and Expo, XP010843271, Jul. 6, 2005, 4 Pages.

Ramprasad Polana, et al., "Detection and recognition of periodic, nonrigid motion", International Journal of Computer Vision, vol. 23, No. 3, XP000696907, Jun. 1, 1997, pp. 261-282.

Mark Allmen, et al., "Cyclic motion detection using spatiotemporal surfaces and curves", Proceedings of the International Conference on Pattern Recognition, vol. I, XP010020293, Jun. 16, 1990, pp. 365-370.

Ross Cutler, et al., "Real-time periodic motion detection, analysis and applications", Proceedings 1999 IEEE Computer Society Conference on Computer Vision and Pattern Recognition, XP000869181, Jun. 23, 1999, pp. 326-332.

\* cited by examiner

FIG.2
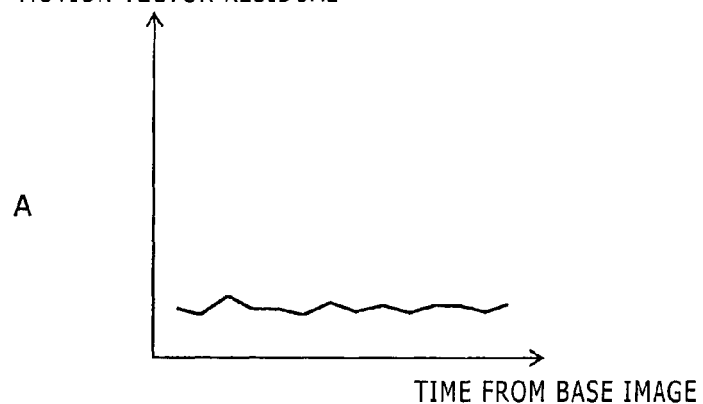
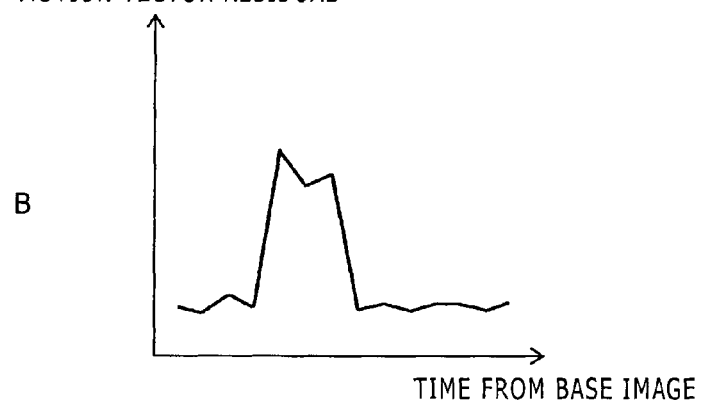
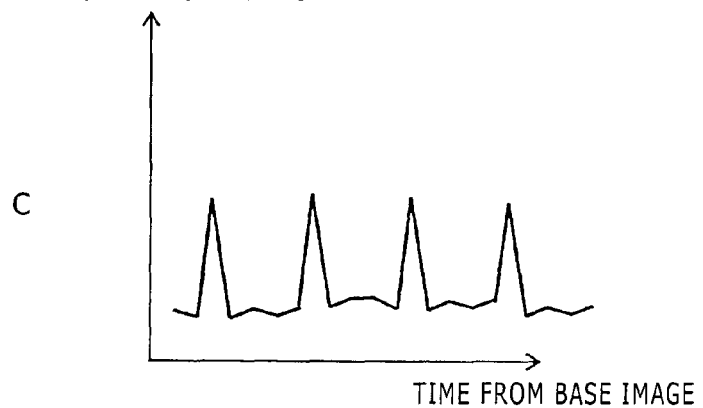

FIG.3
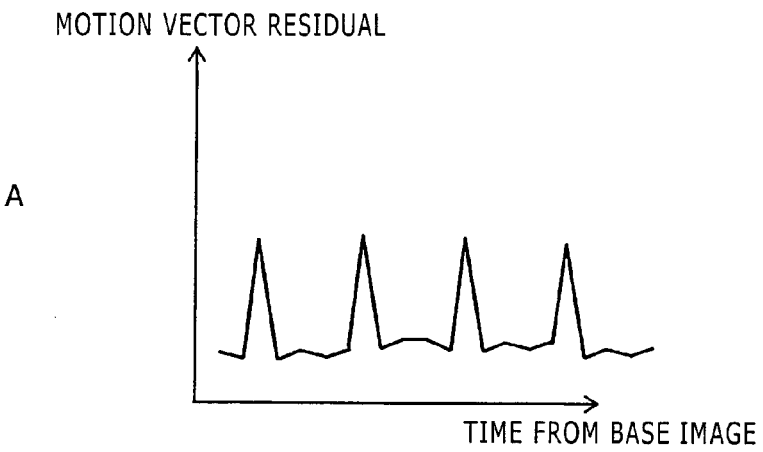
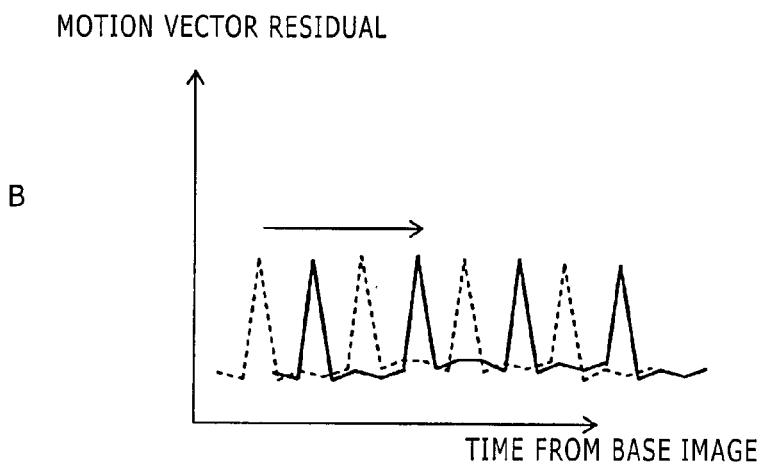
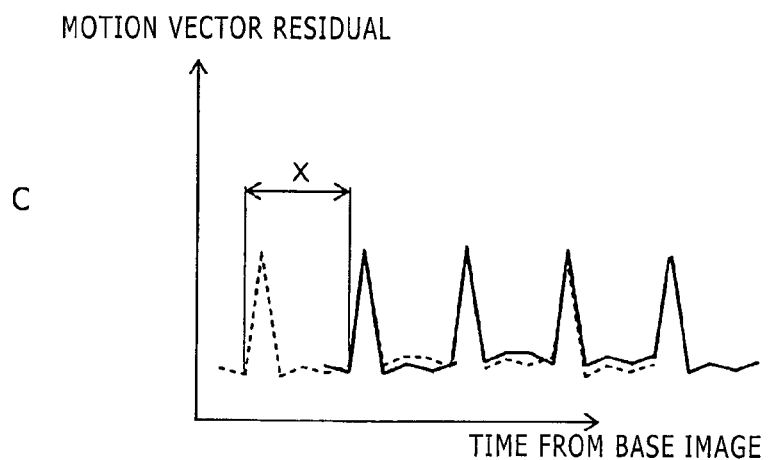

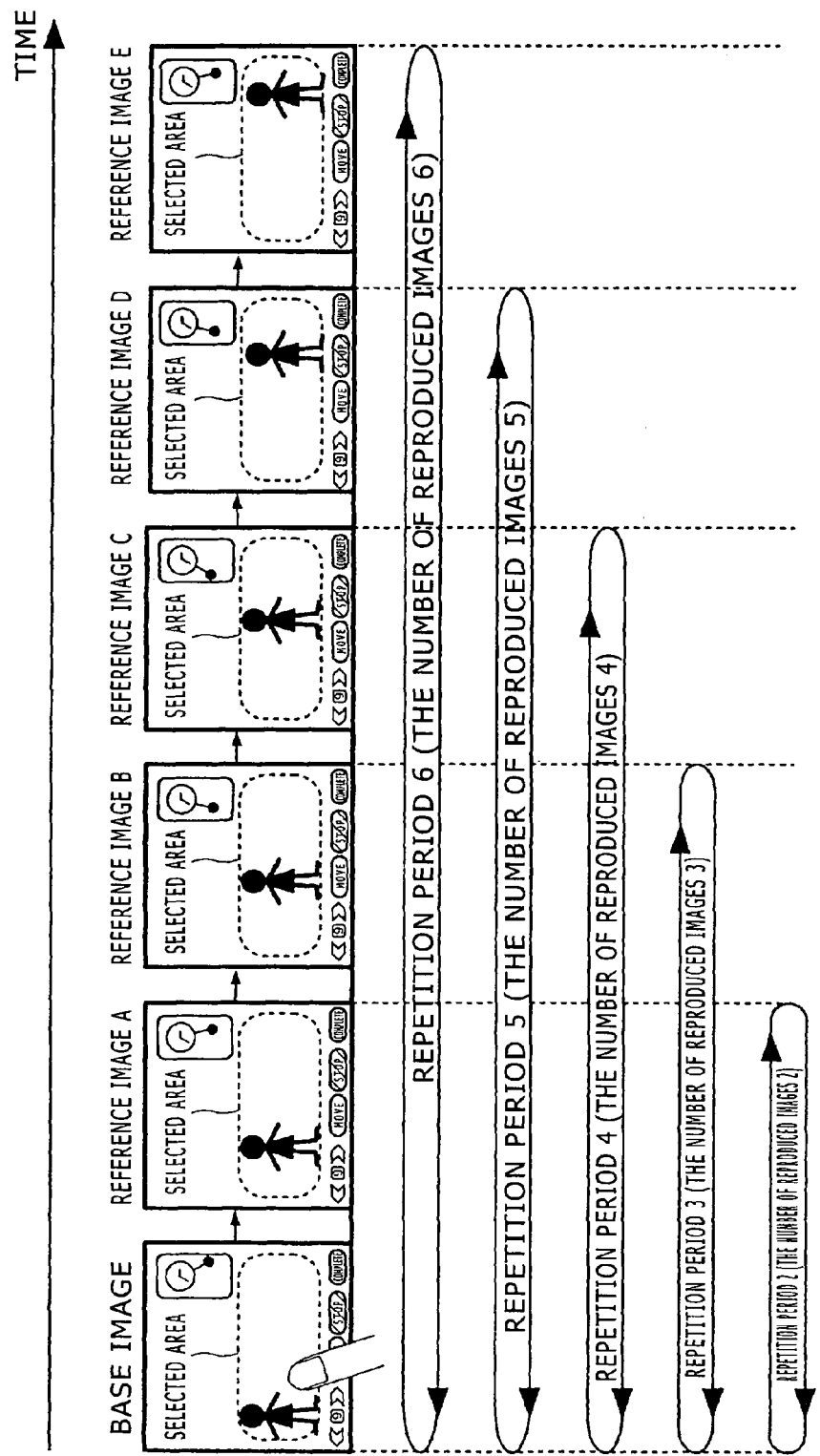

INFORMATION PROCESSING DEVICE AND INFORMATION PROCESSING METHOD

TECHNICAL FIELD

The present technique relates to an information processing device, an information processing method, and an information processing computer program product.

BACKGROUND ART

Conventionally, in the field of image and video, there is a technique in which main subjects that move by every image of plural frame images continuously shot are each extracted and the extracted moving main subjects are attached to and combined with any other still image. By combining the moving main subjects with the still image, a new synthetic moving image is created and reproduction thereof becomes possible.

In order to be used for creation of such a synthetic moving image and so forth, an image processing device that extracts a moving main subject from a processing target image has been proposed (Patent Document 1).

PRIOR ART DOCUMENT

Patent Document

Patent Document 1: Japanese Patent Laid-Open No. 2011-35636

SUMMARY

Technical Problem

The synthetic moving image also has a variety of kinds. In recent years, a technique referred to as a so-called "moving photograph" or the like, which is an image in which only one part continues to move in a still image, is attracting attention. To create the moving photograph, besides extraction of a moving subject, understanding of the period of the motion of the subject and so forth is necessary. Furthermore, complicated programming, image processing, and so forth need to be executed. It is desired that these kinds of necessary processing can be executed by simple operation and interface.

So, an object of the present technique is to provide an information processing device, an information processing method, and an information processing program that are capable of easily creating a so-called moving photograph.

Technical Solution

An information processing device, method and computer program product provide mechanisms for making a moving photograph. The information processing apparatus includes a moving area detector configured to detect a moving area in consecutive images of a processing target image group. The processing target image group includes a base image and a plurality of reference images. A display controller causes the base image to be displayed along with each of the plurality of reference images in succession.

Advantageous Effect

According to the present technique, a so-called moving photograph can be easily created.

BRIEF DESCRIPTION OF DRAWINGS

FIG. 2 is a diagram showing one example of the pattern of the whole screen motion of a subject obtained for each of blocks configuring an image.

FIG. 3 is a diagram for explaining a technique for detecting a periodicity of the motion of the subject.

FIG. 14 is a diagram for explaining processing by a user input processor and display control carried out by the display controller based on information set by the user input processor.

DETAILED DESCRIPTION

Embodiments of the present technique will be described below with reference to the drawings. However, the present technique is not limited to only the following embodiments. The description will be made in the following order.
<1. First Embodiment>
[1-1. Configuration of Information Processing Device]
[1-2. Processing by Information Processing Device]
<2. Second Embodiment>
[2-1. Configuration of Information Processing Device]
[2-2. Processing by Information Processing Device]
<3. Third Embodiment>
[3-1. Configuration of Information Processing Device]
[3-2. Processing by Information Processing Device]
<4. Modification Examples>

1. First Embodiment

[1-1. Configuration of Information Processing Device]

Figure 1:
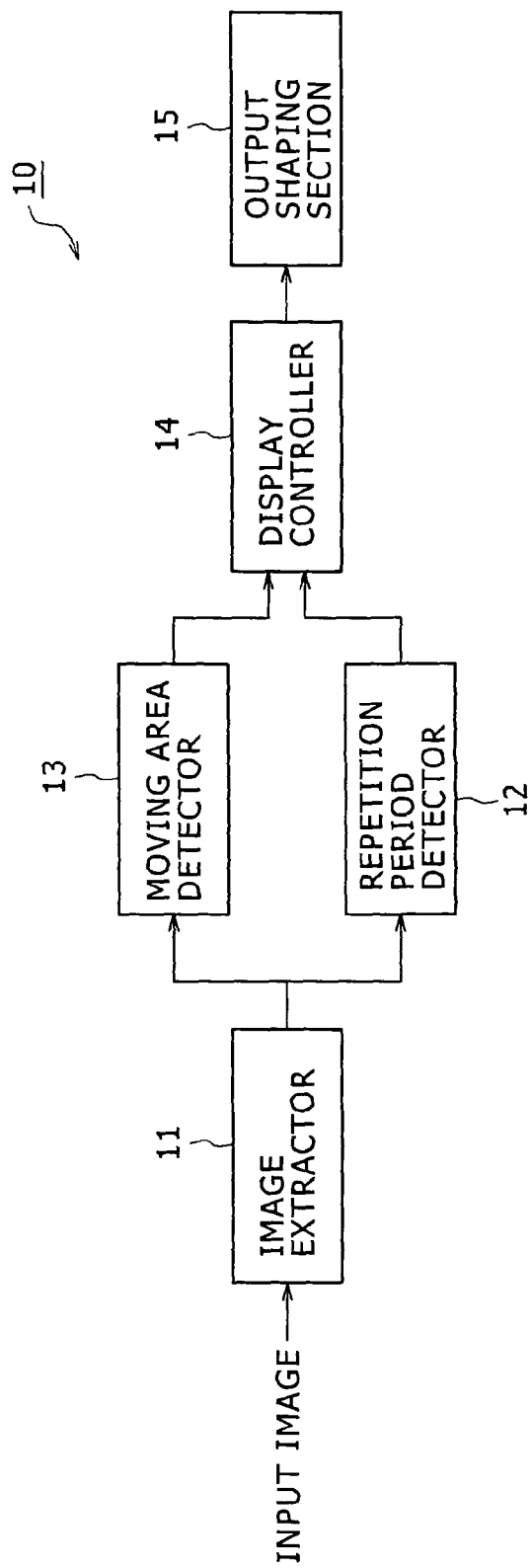
FIG. 1 is a block diagram showing the configuration of an information processing device according to a first embodiment of the present technique.

FIG. 1 is a block diagram showing the configuration of an information processing device 10 according to the present technique. The information processing device 10 is composed of e.g. a CPU (Central Processing Unit), a RAM (Random Access Memory), a ROM (Read Only Memory), and so forth and is realized by running of a predetermined program. In the ROM, a program that is read and operated by the CPU and so forth is stored. The RAM is used as a work memory of the CPU. The CPU executes various kinds of processing in accordance with the program stored in the ROM and issues a command to thereby function as an image extractor 11, a moving area detector 13, a repetition period detector 12, a display controller 14, and an output shaping section 15.

However, the information processing device 10 is not only realized by the program but may be realized as a dedicated device obtained by combining hardware having the respective functions of the image extractor 11, the moving area detector 13, the repetition period detector 12, the display controller 14, and the output shaping section 15.

The information processing device 10 according to the present technique executes processing of creating an image referred to as a so-called "moving photograph" or the like, in which only one part moves in an image and the part other than this one part remains still. In the present specification, explanation will be so made that such an image is called the moving photograph.

Images are input to the image extractor 11 from the external. The input images may be plural still images acquired by continuous shooting or plural frame images configuring a moving image. The image extractor 11 extracts, from these plural input images, one image (hereinafter, referred to as the base image) that configures an area fixedly displayed in a moving photograph (hereinafter, referred to as the fixed area) and serves as the basis of the moving photograph.

Furthermore, the image extractor 11 extracts plural images (hereinafter, referred to as the reference images) for configuring an area that is so displayed as to be moved in the moving photograph (hereinafter, referred to as the moving area). The extracted base image and reference images are supplied to the moving area detector 13 and the repetition period detector 12. In the following description, the series of consecutive images composed of one base image and plural reference images will be referred to as the "processing target image group."

When the input images are plural still images acquired by continuous shooting, it is possible that the extraction of the base image and the reference images is so performed that the first image is deemed as the base image and a predetermined number of images as the second and subsequent images are deemed as the reference images for example.

Furthermore, when the input images are plural frame images configuring a moving image, it is possible that the extraction of the base image and the reference images is so performed that the first frame image is deemed as the base image and a predetermined number of frame images as the second and subsequent frame images are deemed as the reference images. While the number of base images is one, the number of reference images may be any as long as it is a plural number. The number of images extracted as the reference images in the image extractor 11 may be set in advance by default or the user may be allowed to set and change it to an arbitrary number.

Moreover, an input section that accepts an input from the user may be connected to the information processing device 10 and the base image and the reference images may be extracted in accordance with user's specifying input via this input section.

Next, the repetition period detector 12 will be explained. The repetition period detector 12 detects a periodicity of the action of a subject from the processing target image group composed of one base image and plural reference images. When the processing target image group has a periodicity, the motion of the subject peculiar to the moving photograph can be realized if the base image and the reference images are continuously displayed (loop reproduction) in such a manner that this period is repeated. The repetition period detector 12 detects the periodicity with which the loop reproduction appears to be performed with the least sense of discomfort. The repetition period detector 12 is equivalent to the period detector in the scope of claims.

There are various methods as the method for detecting a periodicity from the processing target image group. For example, first, each of the base image and the respective reference images is divided into plural blocks and a motion vector is obtained for each of the blocks by block matching. It is possible that the size of the block is set to e.g. a 16×16 size. However, the size of the block is not limited thereto and may be an arbitrary size. Alternatively, it can be arbitrarily set depending on the size of the image etc.

Then, about the base image, one motion vector that is dominant in the whole image is decided from the motion vectors of all blocks. This one dominant motion vector will be referred to as the "whole screen motion." For example, it is possible that the center value or the average value of the motion vectors in units of the block is employed as the whole screen motion or the most common motion vector in terms of the number is employed as the whole screen motion.

Then, the residual between the whole screen motion of the base image and the motion vector about each block of the reference images is obtained. Then, if the residuals are represented on a graph in such a manner that the ordinate indicates the residual of the motion vector and the abscissa indicates the time of the reference image from the base image, a graph like those shown in FIG. 2 is obtained about each block of the reference images.

When a subject moves in accordance with the whole screen motion, the graph about the block configuring this subject is one in which the residual is uniformly low like that shown in FIG. 2A. Furthermore, the graph about a block configuring a subject that moves but has no periodicity in its motion is one in which no periodicity exists and the residual has an irregular change like that shown in FIG. 2B.

On the other hand, the graph about a block configuring a subject that moves with a periodicity is one in which the magnitude of the residual regularly changes at a constant interval like that shown in FIG. 2C. The graphs shown in FIG. 2A to FIG. 2C are just what shows one example of the shape of the graph and do not necessarily have the shapes shown in FIG. 2A to FIG. 2C.

Then, about each of the obtained graphs, the waveform of the graph is shifted in the progressive direction of the time from the base image. Due to this, because there is a periodicity in the waveform of the graph of FIG. 2C, if the waveform of the graph is shifted in the progressive direction of the time from the base image as shown in FIG. 3B, the original waveform and the shifted waveform substantially overlap with each other as shown in FIG. 3C. The amount x of movement of the waveform at the timing when the waveforms overlap is the repetition period of this block. FIG. 3A is the same as the graph shown in FIG. 2C. In graphs like those shown in FIG. 2A and FIG. 2B, the waveforms do not overlap no matter how much the waveform is shifted in the progression direction of the clock and therefore a repetition period is not detected.

Furthermore, as another method for obtaining the repetition period, there is e.g. a method in which plural minimal points having the minimal values on the graph are obtained and the time differences are taken between the minimal points close to each other in terms of the time to take the average value thereof. Alternatively, decomposition into frequency components may be performed by using a technique of the discrete Fourier transform or so forth and the frequency whose coefficient is the largest may be employed as the repetition period.

By such processing, the block having a periodicity and the repetition period can be obtained. This processing is executed about all reference images. The repetition period is defined by the number of images. When one repetition period is configured by one base image and five reference images, the repetition period is six images.

When plural repetition periods are present in one reference image (for example when a person reciprocating to the left and right and a clock pendulum swinging to the left and right are present), the subject having the larger occupation area in the reference image, of the subjects configured by blocks having a common repetition period, is employed as the repetition period for example. That is, when there are plural subjects configured by blocks having a periodicity, the period of the larger subject is detected as the repetition period. This can be carried out by comparing the subjects configured by blocks having the repetition period with each other by the number of blocks. This is because it is considered that, in the moving photograph creation, the user will desire to move a more eye-catching, large subject to create a moving photograph that gives a profound impression to those who see it.

However, not only the period of the larger subject is detected as the repetition period but the period of a small subject may be detected as the repetition period. Furthermore, the configuration may be so made that, when plural repetition periods are detected, this is noticed to the user and the user can select the repetition period.

Next, the moving area detector 13 will be explained. The moving area detector 13 executes processing of estimating and detecting an area moving in consecutive base image and reference images (moving area) as the area desired to be moved in a moving photograph by the user. The moving area can be detected by using the repetition period obtained by the repetition period detector 12. The block whose repetition period obtained on a block-by-block basis is the same as the repetition period of the whole image is deemed as a block suitable for repeated reproduction, and the area configured by this block is employed as the moving area. The area other than the moving area in the image serves as the fixed area, in which the subject does not move.

Next, the display controller 14 will be explained. The display controller 14 controls image displaying in an external display section connected to the information processing device 10 based on the detection result of the repetition period detector 12 and the moving area detector 13. The display controller 14 carries out the display control to continuously reproduce the base image for the fixed area. Furthermore, for the moving area, the display controller 14 carries out the display control to repeatedly reproduce the images from the base image to the reference images by the repetition period obtained by the repetition period detector 12. Thereby, the input images are displayed as a moving photograph in which only the subject of the moving area moves whereas the subject in the fixed area makes no movement.

Examples of the display section include LCD (Liquid Crystal Display), PDP (Plasma Display Panel), and organic EL (Electro Luminescence) display.

Next, the output shaping section 15 will be explained. The output shaping section 15 executes predetermined image processing such as rendering processing to thereby output, as data of a moving photograph, the processing target image group displayed as the moving photograph by control by the display controller 14. Examples of the format of the output data include gif (Graphics Interchange Format), animation gif, and MPEG (Moving Picture Experts Group). The output moving photograph data can be reproduced in apparatus having a display section, such as personal computer, smartphone, cellular phone, and digital camera, similarly to normal image data, moving image data, etc. Furthermore, it can be reproduced also on Internet browsers.

[1-2. Processing by Information Processing Device]

Figure 4:
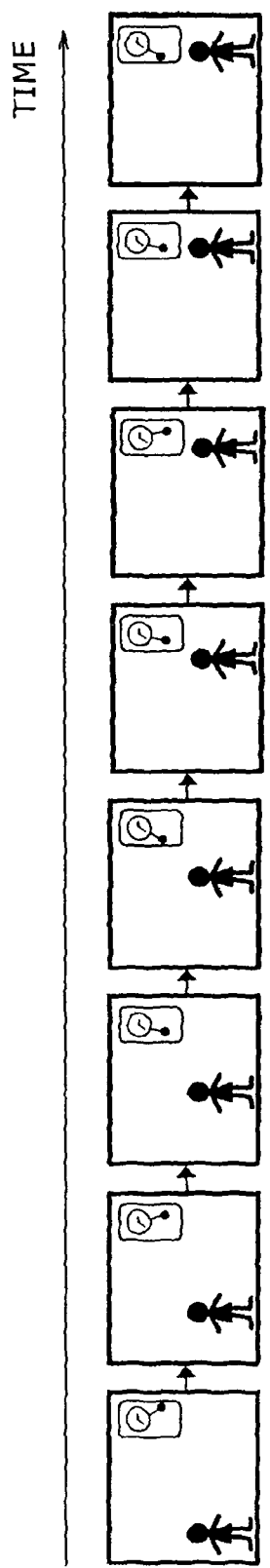
FIG. 4 is a diagram showing one example of images input to the information processing device.

Next, moving photograph creation processing by the information processing device 10 configured in the above-described manner will be explained. The explanation will be made by taking as an example the case in which plural images shown in FIG. 4 are input as the input images. In the input images, a person moves from the left to the right in the image. Moreover, the pendulum of the clock on the upper right part in the image periodically swings to the left and right.

Figure 5:
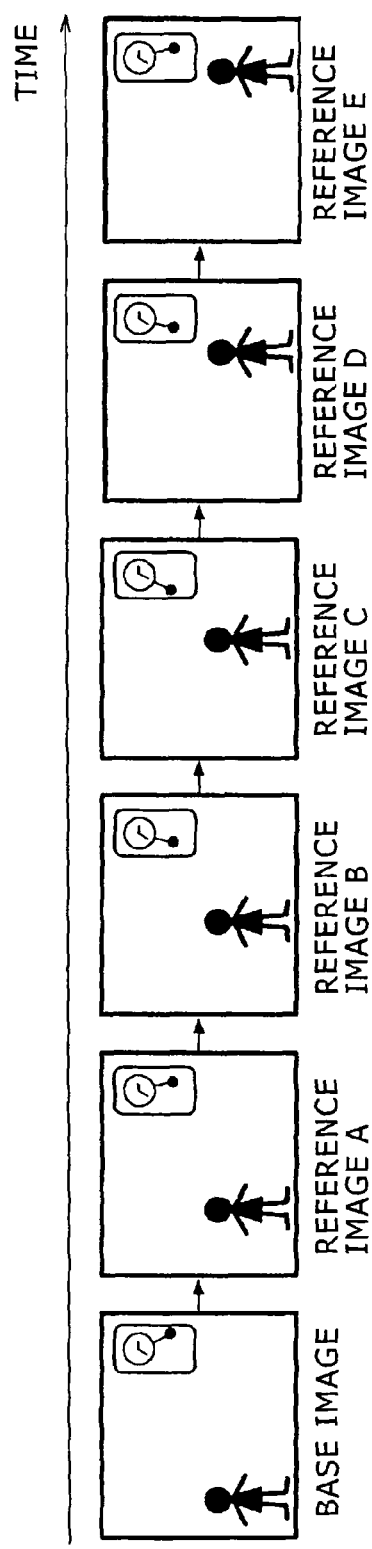
FIG. 5 is a diagram showing one example of a base image and reference images extracted from the input images by an image extractor.

Furthermore, as shown in FIG. 5, the image extractor 11 employs the first image as the base image from this input image group and extracts five images subsequent to it as the reference images (reference image A to reference image E). Five as the number of reference images is just exemplification. As described above, the number of reference images may be set by default or the user may be allowed to set an arbitrary number.

Figure 6:
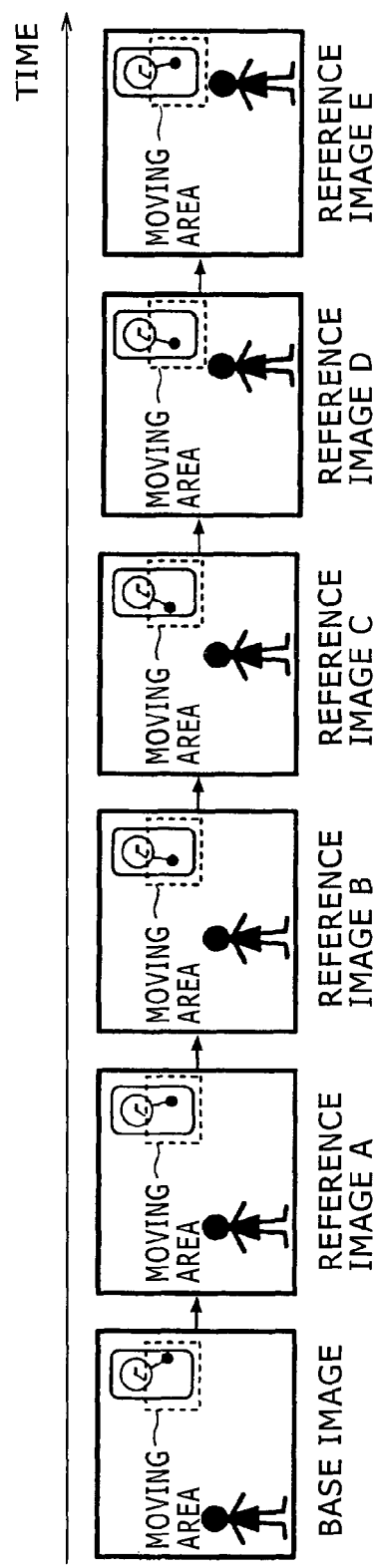
FIG. 6 is a diagram for explaining a moving area detected from the base image and the reference images.

Next, a repetition period is detected from the base image and the reference images by the repetition period detector 12. Furthermore, a moving area is detected from the base image and the reference images by the moving area detector 13. The detection methods by the repetition period detector 12 and the moving area detector 13 are as described above. In the processing target image group shown in FIG. 5, as shown in FIG. 6, the period of the motion of the clock pendulum periodically swinging to the left and right is detected as the repetition period and this clock pendulum is detected as the moving area. The clock pendulum moves in such a manner that one base image and five reference images, total six images, are one period. Furthermore, the whole of the area other than the moving area in the base image and the reference images is the fixed area, in which the subject does not move. That is, the whole of the area other than the clock pendulum in the base image and the reference images is the fixed area.

Figure 7:
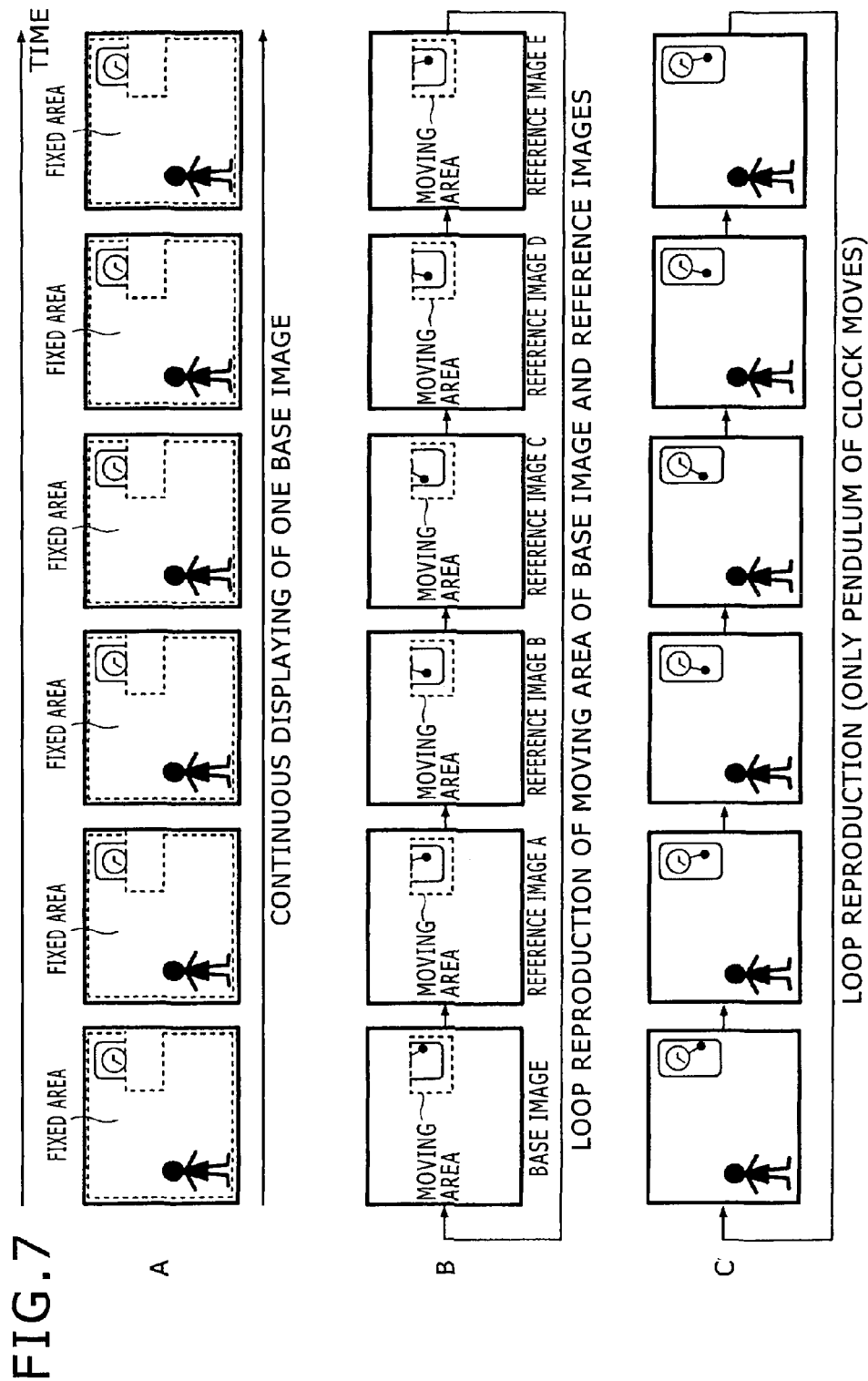
FIG. 7 is a diagram for explaining display processing executed by a display controller.

Furthermore, as shown in FIG. 7A, by the display controller 14, the fixed area is displayed as a still image free from the motion of the subject by continuously displaying the base image. In addition, as shown in FIG. 7B, the moving area is displayed as a moving image in which the pendulum of the clock repeatedly swings to the left and right by loop reproduction of the base image and the reference images in units of six images as the repetition period. The displaying of FIG. 7A and the displaying of FIG. 7B are simultaneously performed. Thereby, the processing target image group can be displayed as a moving photograph in which the person does not move and only the pendulum of the clock continues to repeatedly move, like that shown in FIG. 7C.

The processing target image group displayed as this moving photograph is output as moving photograph data in a file format such as gif, animation gif, or MPEG by the output shaping section 15 as described above.

In this manner, according to the present technique, the moving photograph can be easily created merely by inputting images without executing complicated image processing, programming, etc. by the user. Furthermore, the period of the motion of the subject in the image is detected and loop reproduction of the images is performed in matching with this period. Therefore, the moving photograph with a less sense of discomfort can be created.

For example, although one base image and five reference images, total six images, are extracted, a moving photograph can be created when loop reproduction of four images is performed if the repetition period is composed of one base image and three reference images, i.e. four images. In such a case, remaining two reference images do not need to be used and thus may be discarded without being reproduced.

2. Second Embodiment

[2-1. Configuration of Information Processing Device]

Figure 8:
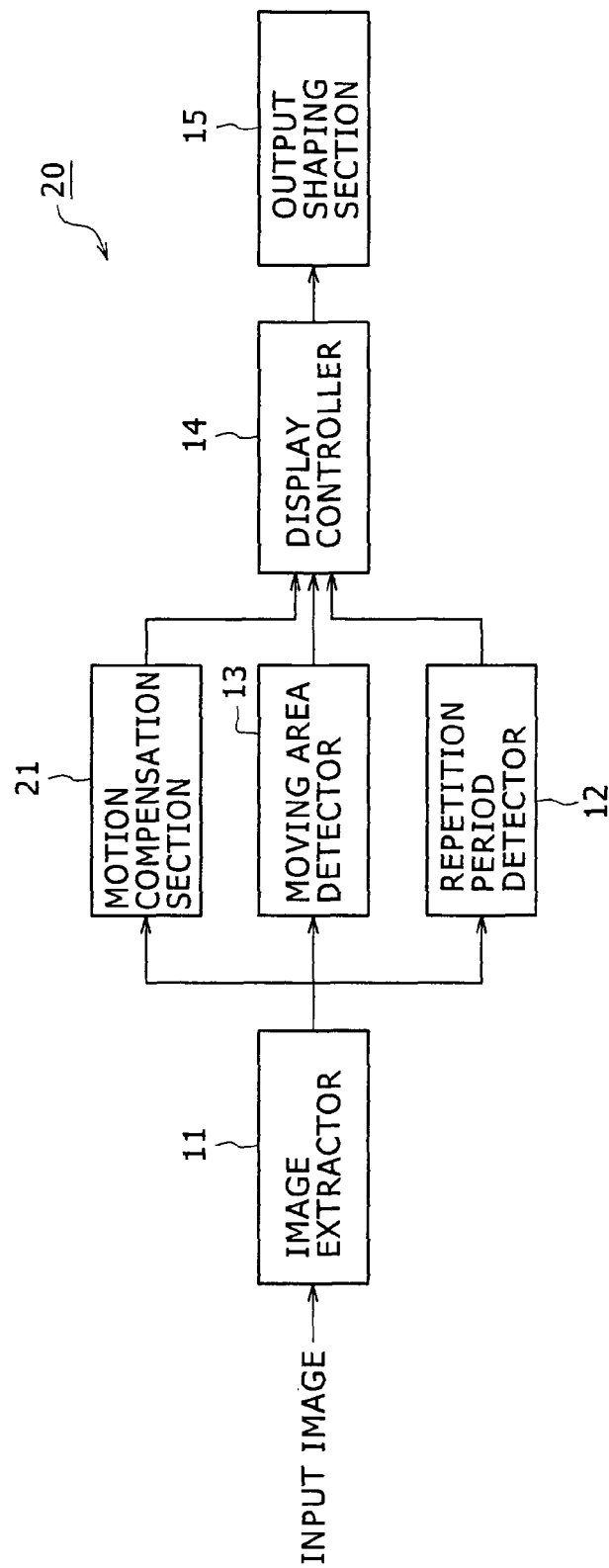
FIG. 8 is a block diagram showing the configuration of an information processing device according to a second embodiment of the present technique.

Next, a second embodiment of the present technique will be explained. FIG. 8 is a block diagram showing the configuration of an information processing device 20 according to the second embodiment. The second embodiment is different from the first embodiment in that it includes a motion compensation section 21. The configuration and processing except for the motion compensation section 21 are the same as those in the first embodiment and therefore description thereof is omitted.

The motion compensation section 21 is processing of correcting, in the base image and the reference images, the shift of the image arising due to shaking by hand or so forth at the time of image acquisition such as imaging. Because generally imaging is performed by a hand-held imaging device, correction processing by the motion compensation section 21 is necessary. Unless the shift of the image due to shaking by hand or so forth is corrected, a shift is generated in the position of the subject and so forth when the base image and the reference images are overlapped with each other and continuously displayed, and a sense of discomfort is given to those who see the moving photograph. In images acquired by a fixed imaging device, the shift between the images is slight even when it exists and therefore the processing by the motion compensation section 21 is unnecessary.

[2-2. Processing by Information Processing Device]

The correction processing by the motion compensation section 21 can be executed by using a technique of electronic camera shake correction widely used conventionally. Therefore, the technique of the correction processing in the motion compensation section 21 is not limited to a specific technique. For example, the motion compensation section 21 can correct a shift between images in the following manner.

Figure 9:
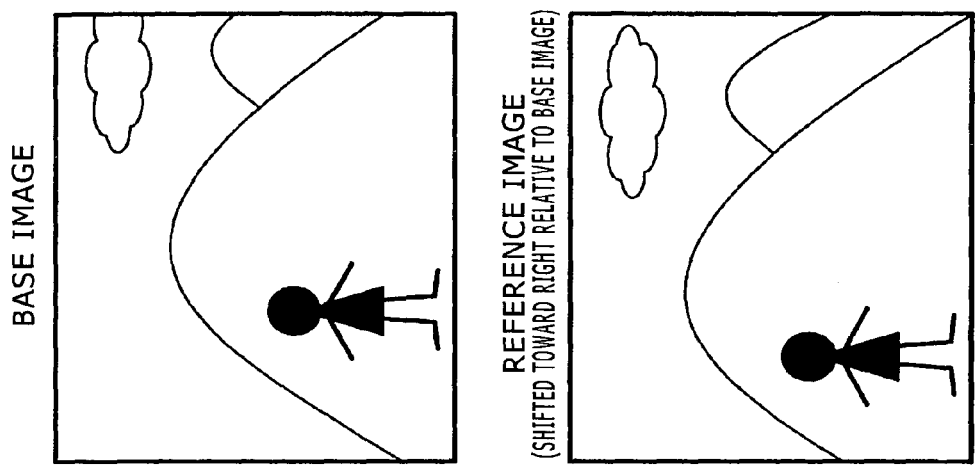
FIG. 9 is a diagram for explaining processing by a motion compensation section.
Figure 10:
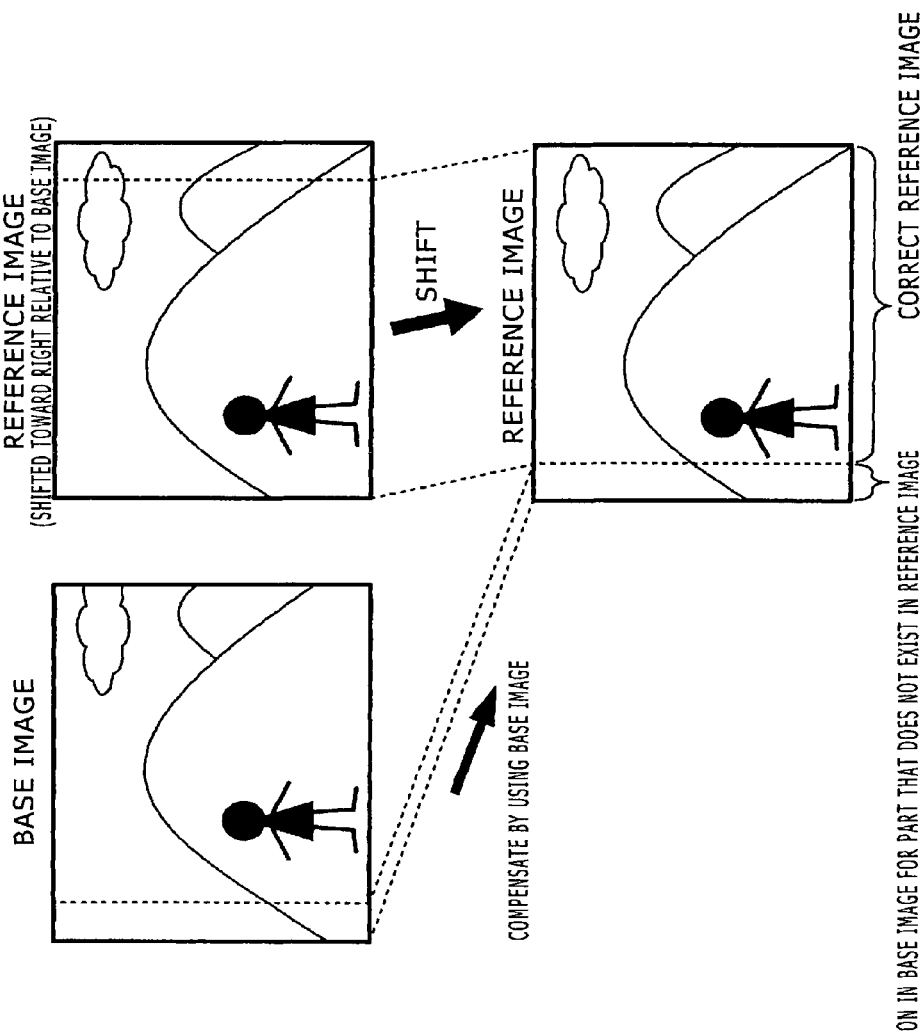
FIG. 10 is a diagram for explaining the processing by the motion compensation section.

With reference to FIG. 9 and FIG. 10, one example of the technique of the processing by the motion compensation section 21 will be explained. By using a base image and a reference image shown in FIG. 9, the processing by the motion compensation section 21 will be specifically explained. In FIG. 9, the reference image is shifted toward the right relative to the base image.

First, the base image and the reference images are divided into plural blocks and a motion vector is obtained for each of the blocks by block matching. It is possible that the size of the block is set to e.g. a 16×16 size. However, the size of the block is not limited thereto and may be an arbitrary size. Alternatively, it can be set depending on the size of the image etc.

Then, about each of the base image and all the reference images, one motion vector that is dominant in the whole image is decided from the motion vectors of all blocks. For example, it is possible that the center value or the average value of the motion vectors in units of the block is employed as the motion vector of the whole image or the most common motion vector in terms of the number is employed as the motion vector of the whole image. Similarly to the first embodiment example, this one dominant motion vector will be referred to as the "whole screen motion." For example, it is possible that the center value or the average value of the motion vectors in units of the block is employed as the whole screen motion or the most common motion vector in terms of the number is employed as the whole screen motion.

Then, as shown in FIG. 10, the reference image is so shifted as to cancel out the whole screen motion of the reference image. This provides matching of the composition of the reference image with the composition of the base image. Unless the motion is the zero vector, an area that does not exist in the reference image (right end, in the reference image in FIG. 10) is inevitably generated in the reference image after being shifted. Compensation for this area can be achieved by filling it by utilizing the same area in the base image as shown in FIG. 10.

The motion compensation section 21 executes the above-described correction processing for all the reference images. Due to this, the shifts of all the reference images relative to the base image become extremely small, which prevents the user from being given a sense of discomfort when the base image and the reference images are continuously displayed. If there is a need to correct even rotation and zoom, the affine parameter may be obtained from the motion vector of each block.

Furthermore, in the information processing device 20, in addition to the correction processing by the motion compensation section 21, the processing by the repetition period detector 12 and the processing by the moving area detector 13 are executed similarly to the first embodiment. According to the second embodiment, the moving photograph is created with correction of the shift between the images due to shaking by hand or so forth. Thus, the moving photograph with a less sense of discomfort due to the shift of the subject or so forth can be created.

The processing by the motion compensation section 21, the processing by the repetition period detector 12, and the processing by the moving area detector 13 are each independent processing conceptually. The execution order thereof is no object and it is also possible that they are processed in parallel. However, enhancement in the speed of the calculation is also enabled through effective sharing and utilizing of the necessary calculation result and so forth in common to each other.

Specifically, in the explanation of the first embodiment, the repetition period detector 12 executes processing of dividing the base image and the reference images into plural blocks and obtaining the motion vector for each of the blocks by block matching. In contrast, in the second embodiment, processing of obtaining the motion vector about each image is executed by the motion compensation section 21 before the period detection processing and the moving area detection processing. Then, the repetition period detector 12 diverts the motion vectors of the respective images obtained by the motion compensation section 21. This can reduce the processing executed in the repetition period detector 12. Furthermore, the moving area detector 13 can perform the moving area detection by using the detection result by the repetition period detector 12. This can realize reduction in the circuit scale and enhancement in the speed of the calculation.

3. Third Embodiment

[3-1. Configuration of Information Processing Device]

Figure 11:
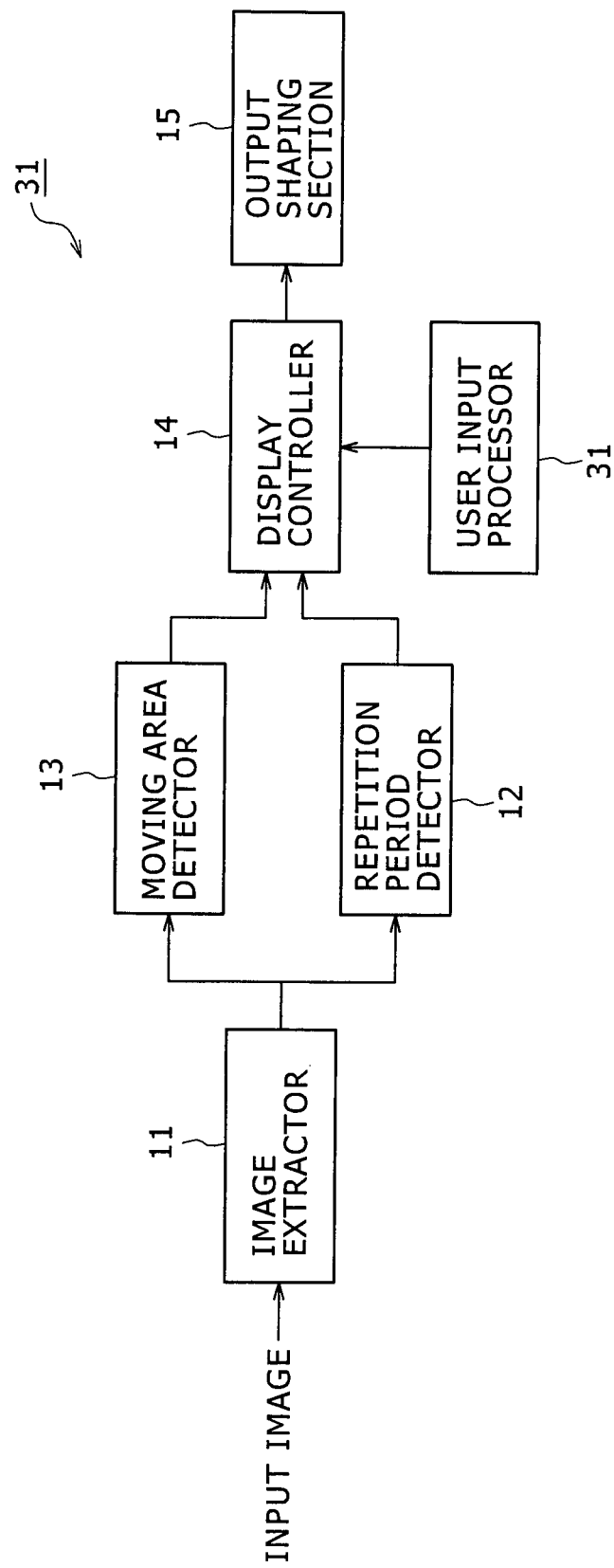
FIG. 11 is block diagram showing the configuration of an information processing device according to a third embodiment of the present technique.

Next, a third embodiment of the present technique will be explained. FIG. 11 is a block diagram showing the configuration of an information processing device 30 according to the third embodiment. The third embodiment is different from the first embodiment in that it includes a user input processor 31. The configuration other than the user input processor 31 is the same as that in the first embodiment and therefore description thereof is omitted.

The user input processor 31 accepts area specifying input via an input user interface connected to the information processing device 30 to set this area as the moving area or the fixed area and transmit information thereof to the display controller 14. Moreover, the user input processor 31 sets the period input via the input user interface as the repetition period and transmits information thereof to the display controller 14. Then, the display controller 14 carries out display control based on these pieces of information and carries out display control so that the processing target image group may be displayed as a moving photograph. Thereby, the moving photograph reflecting user's intention can be created.

Figure 12:
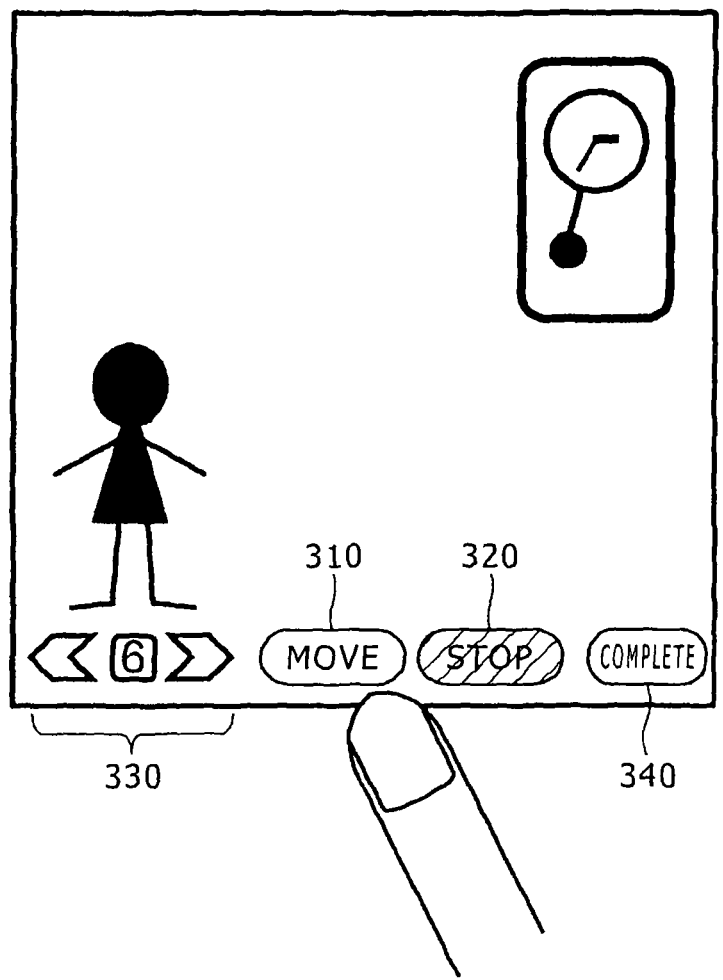
FIG. 12 is a diagram for explaining a user interface.

FIG. 12 is a diagram showing one example of the user interface for input by the user. The user interface shown in FIG. 12 is configured by software buttons displayed on a touch screen composed of a touch panel and a display. When input by the user is made to this user interface, a predetermined control signal indicating the input contents thereof is supplied to the user input processor 31.

The user interface of FIG. 12 includes a "Move" button 310310 for switching the user interface to a mode to specify the moving area in the moving photograph and a "Stop" button 320 for switching the user interface to a mode to specify the fixed area in the moving photograph.

Furthermore, the user interface includes a repetition period input button 330 for input of the repetition period (the number of loop-reproduced images) and a "Complete" button 340 for input of completion of the correction. The number of loop-reproduced images as the repetition period is displayed at the center of the repetition period input button 330 and the value thereof can be changed by the left and right buttons. These buttons are configured by software buttons displayed as icons in the touch screen. The user brings a finger or the like, such as a contact object (e.g., stylus) into contact with the respective buttons and thereby can perform switching of the mode, change of the repetition period, and completion of the input. Furthermore, the user can specify an area by bringing a finger or the like into contact with the touch screen.

The "Move" button 310 and the "Stop" button 320 are either-or. When one is set selected/active, the other becomes non-selected/non-active. When the "Move" button 310 is selected, the mode becomes a moving area input mode to specify the area desired to be employed as the moving area in the input images. When the "Stop" button 320 is selected, the mode becomes a fixed area input mode to specify the area desired to be employed as the fixed area in the input images.

Figure 13:
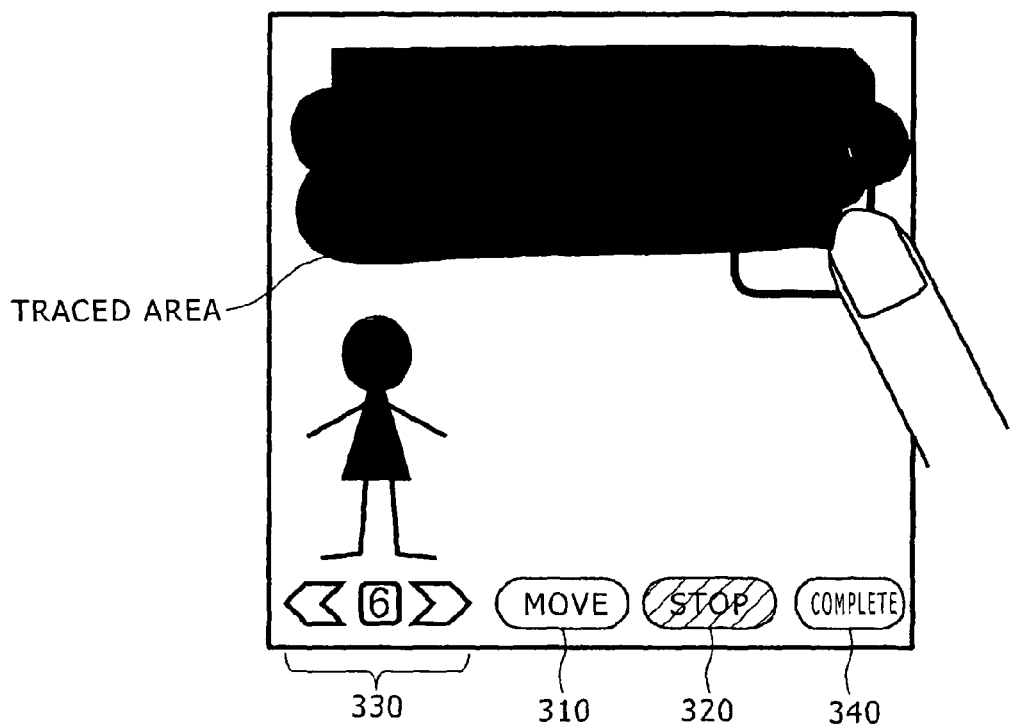
FIG. 13 is a diagram for explaining the user interface.

In the moving area input mode, when the user brings a finger into contact with the image displayed on the touch screen and traces an arbitrary area, information indicating this traced area is supplied to the user input processor 31. Then, this traced area is set as the moving area by the user input processor 31. In order to allow easy understanding of the area traced by the user, the display section such as the touch screen may display the traced area (trajectory of the passage of a finger or the like) in a colored manner as shown in FIG. 13 based on the information that is accepted by the user input processor 31 and indicates the input area.

On the other hand, in the fixed area input mode, when the user brings a finger into contact with the image displayed on the touch screen and traces an arbitrary area, information indicating this traced area is supplied to the user input processor 31. Then, this traced area is set as the fixed area by the user input processor 31. Also in this case, the traced area (trajectory of the passage of a finger or the like) may be displayed in a colored manner as shown in FIG. 13 so that the area traced by the user can be easily understood.

[3-2. Processing by Information Processing Device]

With reference to FIG. 14, the processing by the user input processor 31 will be specifically explained. In FIG. 14, one base image and five reference images are shown. In these images, a person moving from the left to the right and a clock whose pendulum swings to the left and right are included as subjects.

When the user desires to move the person in the moving photograph, the user brings a finger or the like into contact with the "Move" button 310 to set the user interface to the moving area input mode, and thereafter traces the area in which the person moves as the selected area with a finger or the like as shown in FIG. 14. Thereupon, the user input processor 31 sets this selected area as the moving area and supplies information indicating this moving area to the display controller 14. For the set moving area, the display controller 14 performs loop reproduction of the images from the base image to the reference images and continuously displays them. This allows the person to be repeatedly moved from the left to the right in the moving photograph.

On the other hand, when the user does not desire to move the person in the moving photograph, the user brings a finger or the like into contact with the "Stop" button 320 to set the user interface to the fixed area input mode, and thereafter traces the area in which the person moves as the selected area with a finger or the like as shown in FIG. 14. This selected area is set as the fixed area by the user input processor 31 and information indicating this fixed area is supplied to the display controller 14. As described above, for the fixed area, the display controller 14 continuously displays only the base image to thereby realize the state in which the subject in the moving photograph does not move.

By bringing a finger or the like into contact with the touch screen and making input in the state in which the base image and the reference images are continuously reproduced, the above-described input can be made to all the base image and the reference images.

Furthermore, the user input processor 31 sets the repetition period based on the repetition period (the number of reproduced images) input by the repetition period input button 330. When a finger or the like is brought into contact with the repetition period button and the repetition period (the number of reproduced images) displayed at the center of the repetition period input button 330 is changed, the repetition period (the number of reproduced images) is set as shown in FIG. 14.

As shown in FIG. 14, when the user input processor 31 sets the repetition period to six based on input by the user, the display controller 14 performs loop reproduction of the base image and the reference images A to E, i.e. six images. When the repetition period is set to five, the base image and the reference images A to D, i.e. five images, are loop-reproduced. When the repetition period is set to four, the base image and the reference images A to C, i.e. four images, are loop-reproduced. When the repetition period is set to three, the base image and the reference images A and B, i.e. three images, are loop-reproduced. When the repetition period is set to two, the base image and the reference image A, i.e. two images, are loop-reproduced.

In this manner, the user can arbitrarily set the repetition period. Due to this, even when there is a sense of discomfort in the motion of the subject in the moving photograph in the case of the repetition period estimated by the repetition period detector 12, this can be corrected. Furthermore, it also becomes possible to daringly create a moving photograph in which the motion of the subject is discontinuous.

If the setting of the moving area, the fixed area, and the repetition period becomes one desired by the user, input is made to the "Complete" button 340 and thereby data of the moving photograph is output by the output shaping section 15.

Even when the same area and the repetition period in the processing target image group are detected by the moving area detector 13 and the repetition period detector 12, the display controller 14 may give priority to information from the user input processor 31 and continuously display the processing target image group based on the information from the user input processor 31. Thereby, the moving photograph based on the detection result by the moving area detector 13 and the repetition period detector 12 can be corrected to one that meets user's intention.

The user interface is not limited to one shown in FIG. 12 and FIG. 13. Any icon may be employed as long as it allows input of the above-described "move," "stop," "repetition period and adjustment thereof," and "complete" and this icon may be disposed in any way.

Furthermore, the user interface is not limited to the touch screen and any interface may be employed as long as it allows input. For example, mouse, cross button, etc. are available. In the case of specifying an area by mouse, cross button, etc., a frame for specifying an area can be so displayed as to be superimposed on the image and an area can be specified by adjusting the size of this frame through operation of the mouse, cross button, etc.

In this manner, by accepting input from the user and setting the moving area and the fixed area in response to input from the user to create a moving photograph, even when the motion of the subject is not periodic, a moving photograph in which this moving subject keeps on continuously moving can be created. Examples of the case in which the subject does not periodically move include a vehicle travelling in one direction and the flow of a liquid such as water.

By combining the second embodiment and the third embodiment, the information processing device may be so configured as to include the motion compensation section and the user input processor 31.

Furthermore, the user may be allowed to select the base image. This makes it possible to adjust the position of a subject that is a moving subject but does not move in the moving photograph in matching with user's preference.

This point will be specifically explained with reference to FIG. 5. Suppose that the pendulum of the clock is the moving area and the person is included in the fixed area in FIG. 5. For example, if the left end image among the images in FIG. 5 is employed as the base image, the person is fixed at the left end in the moving photograph. Furthermore, if the right end image is employed as the base image, the person is fixed at the right end in the moving photograph. In addition, if the fourth image from the left (reference image C, in FIG. 5) is employed as the base image, the person is fixed near substantially the center of the image. This is because only the base image is loop-reproduced for the fixed area and therefore the person included in the fixed area does not move in the moving photograph.

If a moving photograph is created based on information set by the user input processor 31, the repetition period detector 12 and the moving area detector 13 do not need to operate and are unnecessary configurations.

The processing functions of the above-described information processing device can be realized by a computer, which includes processing circuitry. In this case, a program that describes the processing contents of the functions that should be possessed by this information processing device is provided. Furthermore, this program is run by the computer and thereby the above-described processing functions are realized on the computer. The program that describes the processing contents can be recorded in a computer-readable recording medium such as an optical disc or a semiconductor memory.

In the case of distributing the program, for example, a portable recording medium such as an optical disc or a semiconductor memory in which this program is recorded is provided or sold. Furthermore, it is also possible to store the program in a server and provide the program via a network.

The computer to run the program stores, in an own storage device, the program recorded in a portable recording medium or the program transferred from a server for example. Then, the computer reads the program from the own storage device and executes processing in accordance with the program. It is also possible for the computer to directly read the program from a portable recording medium and execute processing in accordance with this program. Furthermore, it is also possible for the computer to sequentially execute processing in accordance with a received program every time the program is transferred from a server.

Apparatus such as personal computer, imaging device such as a digital camera, smartphone, cellular phone, tablet terminal, portable game machine, and portable music player may be allowed to have the functions as the above-described information processing device. Furthermore, the above-described apparatus may be allowed to have the functions as the information processing device through installation of a program to realize the functions of the information processing device.

Moreover, the functions as the information processing device may be provided as a service provided by a server existing on a network, i.e. a so-called cloud service.

Several application examples to which the present technique is actually applied will be explained. First, one of the application examples is an application with which a moving photograph can be lightly taken with a feeling of commonly taking a still image by a camera, a smartphone, etc. Camera images obtained while the shutter button is pressed down with a camera or a smartphone are buffered in an internal memory or the like and the present technique is applied simultaneously with shutter release. At this time, the first image in the internal buffer may be employed as the base image and the remaining images may be employed as the reference images. Through automatic generation and correction by the user, one moving photograph is easily generated.

Another application example is an edit application with which a moving photograph is created through an edit from a moving image. This example is suitable for a personal computer, a video camcorder, or even a digital still camera where successive photos are taken, etc. The user searches for a scene suitable for a moving photograph while reproducing a moving image. When finding the scene, the user specifies the start frame and the end frame with which the moving photograph is made to thereby create the moving photograph from the images between them. In this case, because the user can select the base image, the reference images, and the period with a fine range while viewing the images with user's eyes, it is expected that the moving photograph with a higher degree of completion can be made.

4. Modification Examples

Although one embodiment of the present technique is specifically explained above, the present technique is not limited to the above-described embodiments and various kinds of modifications based on the technical idea of the present technique are possible.

The present technique can take also the following configurations.

According to on exemplary embodiment, an information processing device includes
- a moving area detector configured to detect a moving area in images of a processing target image group, the processing target image group including a base image and a plurality of reference images; and
- a display controller that causes the base image to be displayed along with each of the plurality of reference images in succession.

According to one aspect
the moving area detector includes processing circuitry.

According to another aspect
the display controller is configured to automatically generate and display the base image and the plurality of reference images as a moving photograph.

According to another aspect
the display controller is configured to display the base image and plurality of reference images as a moving photograph after at least one of said base image and plurality reference images is user selected.

According to another aspect, the device further includes a display on which the base image is displayed along with the plurality of reference images in succession.

According to another aspect, the device further includes an image extractor that receives the base image and plurality of reference images from at least one of a digital still camera and a video camera.

According to another aspect, the device further includes an image extractor that identifies the plurality of reference images to be displayed as at least a part of the moving area of a moving photograph.

According to another aspect, the device further includes an image extractor that extracts an image as the base image and shows an area fixedly displayed in a moving photograph and is displayed in an area other than the moving area.

According to another aspect, the device further includes a repetition period detector that detects a periodicity of action of a subject in the processing target image group that includes the base image and the plurality of reference images.

According to another aspect, the device further includes a motion compensation section configured to supplement content of at least one image of the plurality of references images, said content being supplied from a shift of the base image in an imaging area.

According to another aspect, the device further includes an input processor configured to receive information from a user interface to adjust a feature of the processing target image group that forms a moving picture displayed by the display controller, wherein
at least one image of said processing target image group being adjusted based on the information.

According to another aspect
the information includes a control signal generated in response to actuation of a button on the user interface.

According to another aspect
the button is a software button and is at least one of a repetition period input button, a move button, a stop button, and a complete button.

According to another aspect
the input processor receives the information as a specified image area entered from a touch screen of the user interface.

According to another aspect
the specified image area is a traced area that is specified by a contact object passing across and in contact with a portion of the touch screen.

According to another aspect
when the image processing device is set in a moving area input mode, the traced area specifies the moving area.

According to another aspect
when the image processing device is set in a fixed area input mode, the traced area specifies a fixed area that corresponds with the base image.

According to another aspect
the display controller causes the touch screen to display the specified image area as a traced area.

According to an image processing method embodiment, the method includes
- detecting a moving area in images of a processing target image group, the processing target image group including a base image and a plurality of reference images; and
- causing with a display controller the base image to be displayed along with each of the plurality of reference images in succession.

According to a non-transitory computer readable medium embodiment, the medium has computer readable instructions stored therein that when executed by circuitry causes the circuitry to implement an image processing method, the image processing method includes
- detecting a moving area in images of a processing target image group, the processing target image group including a base image and a plurality of reference images; and
- causing with a display controller the base image to be displayed along with each of the plurality of reference images in succession.

According to an information processing device includes
- a moving area detector that detects, as a moving area, an area that corresponds to a subject moving by continuous displaying of a plurality of images and is in the plurality of images; and
- a display controller that carries out display control to continuously display the plurality of images for the moving area and continuously display one image among the plurality of images for an area other than the moving area.

According to another aspect, the device further includes
a period detector that detects a periodicity of subject motion arising when the plurality of images are continuously displayed, wherein
the display controller carries out display control to continuously display the plurality of images in such a manner that the periodicity is repeated for an area that is detected as the moving area by the moving area detector and from which the periodicity is detected by the period detector.

According to another aspect the display controller carries out display control to continuously display images in such a manner that the periodicity is repeated by continuously displaying images in a range from which the periodicity of the plurality of images is detected.

According to another aspect, the device further includes a user input processor that sets, as the moving area, an area that is specified as the moving area by a user and is in the plurality of images and supplies information indicating the moving area to the display controller.

According to another aspect the user input processor sets, as an area other than the moving area, an area that is specified as the area other than the moving area by a user and is in the plurality of images and supplies information indicating the area other than the moving area to the display controller.

According to another aspect the display controller carries out the display control based on the information indicating the moving area and/or the information indicating the area other than the moving area when the display controller is supplied with the information indicating the moving area or/and the information indicating the area other than the moving area from the user input processor.

According to another aspect, the device further includes a motion compensation section that executes processing of correcting a shift of an image other than a predetermined image among the plurality of images relative to the predetermined image.

According to another aspect the motion compensation section executes processing of calculating a motion vector of a whole image about each of the plurality of images and correcting the shift based on the motion vector.

According to another aspect the moving area detector detects the moving area by using the motion vector obtained by the motion compensation section.

According to another aspect the period detector detects the periodicity by using the motion vector obtained by the motion compensation section.

According to an image processing method embodiment, the method includes
detecting, as a moving area, an area that corresponds to a subject moving by continuous displaying of a plurality of images and is in the plurality of images; and
carrying out display control to continuously display the plurality of images for the moving area and continuously display one image among the plurality of images for an area other than the moving area.

According to a non-transitory computer readable medium embodiment, the medium has computer readable instructions stored therein that when executed by circuitry causes the circuitry to implement an image processing method, the image processing method includes
detecting, as a moving area, an area that corresponds to a subject moving by continuous displaying of a plurality of images and is in the plurality of images; and
carrying out display control to continuously display the plurality of images for the moving area and continuously display one image among the plurality of images for an area other than the moving area.

EXPLANATION OF REFERENCE NUMERALS 10, 20, 30: Information processing device
11: Image extractor
12: Repetition period detector
13: Moving area detector
14: Display controller
15: Output shaping section

The invention claimed is:

1. An image processing device, comprising:
a moving area detector configured to detect a moving area in a processing target image group;
a repetition period detector configured to detect a periodicity of action of a subject in the processing target image group, wherein the periodicity is detected based on division of each image of the processing target image group into a plurality of blocks, and wherein a size of each block of the plurality of blocks is set based on a size of each image of the processing target image group; and
a display controller configured to display a moving image based on the moving area and the periodicity of the action of the subject.

2. The image processing device of claim 1, wherein the display controller is further configured to generate and display a base image and a plurality of reference images of the processing target image group as a moving photograph.

3. The image processing device of claim 2, further comprising:
an input processor configured to:
receive a specified image area in the processing target image group as a first user input;
set the specified image area as a fixed area, wherein the fixed area includes at least one stationary subject; and
receive at least one of the base image or the plurality of reference images of the processing target image group, wherein the base image and the plurality of reference images are selected by a second user input; and
the display controller is further configured to:
display the moving image further based on the fixed area; and
display the base image and the plurality of reference images as the moving photograph based on the selection.

4. The image processing device of claim 3, wherein the input processor is further configured to receive the specified image area via a user interface to adjust a feature of the processing target image group, and wherein the processing target image group forms a moving picture displayed by the display controller.

5. The image processing device of claim 4, wherein the input processor is further configured to receive the specified image area entered from a touch screen of the user interface.

6. The image processing device of claim 5, wherein the specified image area is a traced area that is specified by a contact object that passes across and in contact with a portion of the touch screen.

7. The image processing device of claim 6, wherein the traced area specifies the moving area based on the image processing device set in a moving area input mode.

8. The image processing device of claim 6, wherein the traced area specifies the fixed area that corresponds with the base image based on the image processing device set in a fixed area input mode.

9. The image processing device of claim 5, wherein
the display controller is further configured to cause the touch screen to display the specified image area as a traced area.

10. The image processing device of claim 2, further comprising
a display device configured to display the base image along with the plurality of reference images in succession.

11. The image processing device of claim 2, further comprising
an image extractor configured to receive the base image and the plurality of reference images from at least one of a digital still camera or a video camera.

12. The image processing device of claim 2, further comprising
an image extractor configured to identify the plurality of reference images, wherein the plurality of reference images is displayed as at least a part of the moving area of the moving photograph.

13. The image processing device of claim 2, further comprising
an image extractor configured to extract an image as the base image and show a first area fixedly displayed in the moving photograph, wherein the base image is displayed in a second area other than the moving area.

14. The image processing device of claim 2, further comprising
a motion compensation section configured to supplement content of at least one image of the plurality of references images based on a motion vector determined for the processing target image group, wherein the content supplemented by the motion compensation section is supplied from a shift of the base image in an imaging area.

15. The image processing device of claim 14, wherein the motion vector determined for the processing target image group is an average of motion vectors obtained for each of the base image and the plurality of reference images.

16. The image processing device of claim 14, wherein the motion compensation section is further configured to shift a reference image of the plurality of reference images such that the motion vector determined for the processing target image group is canceled, and a composition of the reference image matches a composition of the base image.

17. The image processing device of claim 2, wherein a repetition period of the periodicity is defined by a number of the plurality of reference images.

18. The image processing device of claim 1, wherein the repetition period detector is further configured to detect, as the periodicity of the action of the subject, a repetition period of the subject over a number of images of the processing target image group.

19. The image processing device of claim 1, wherein the repetition period detector is further configured to:
detect a plurality of subjects that have the periodicity in the processing target image group; and
detect the periodicity of one subject of the plurality of subjects as a repetition period.

20. An image processing method, comprising:
detecting a moving area in a processing target image group;
detecting a periodicity of action of a subject in the processing target image group, wherein the periodicity is detected based on division of each image of the processing target image group into a plurality of blocks, and wherein a size of each block of the plurality of blocks is set based on a size of each image of the processing target image group; and
controlling, by a display controller, display of a moving image based on the moving area and the periodicity of the action of the subject.

21. A non-transitory computer-readable medium having stored thereon, computer-executable instructions, which when executed by circuitry, cause the circuitry to execute operations, the operations comprising:
detecting a moving area in a processing target image group;
detecting a periodicity of action of a subject in the processing target image group, wherein the periodicity is detected based on division of each image of the processing target image group into a plurality of blocks, and wherein a size of each block of the plurality of blocks is set based on a size of each image of the processing target image group; and
controlling, by a display controller, display of a moving image based on at least one of the moving area and the periodicity of the action of the subject.

* * * * *